(12) United States Patent
Larsson et al.

(10) Patent No.: US 8,201,855 B2
(45) Date of Patent: Jun. 19, 2012

(54) PIPE FITTING

(75) Inventors: Thomas Larsson, Kungsör (SE); Jarmo Smahl, Nastola (FI)

(73) Assignee: Uponor Innovation AB, Fristad (CH)

( * ) Notice: Subject to any disclaimer, the term of this patent is extended or adjusted under 35 U.S.C. 154(b) by 67 days.

(21) Appl. No.: 12/302,076

(22) PCT Filed: May 23, 2007

(86) PCT No.: PCT/FI2007/050292
§ 371 (c)(1),
(2), (4) Date: May 1, 2009

(87) PCT Pub. No.: WO2007/138159
PCT Pub. Date: Dec. 6, 2007

(65) Prior Publication Data
US 2009/0302599 A1 Dec. 10, 2009

(30) Foreign Application Priority Data
May 26, 2006 (EP) .................................... 06114575

(51) Int. Cl.
*F16L 15/00* (2006.01)

(52) U.S. Cl. ........................................ 285/390; 285/238
(58) Field of Classification Search .................. 285/238, 285/390
See application file for complete search history.

(56) References Cited

U.S. PATENT DOCUMENTS

| | | | |
|---|---|---|---|
| 3,854,759 A | 12/1974 | Cornelius | |
| 4,018,462 A | 4/1977 | Saka | |
| 4,059,293 A * | 11/1977 | Sipler | 285/236 |
| 5,388,873 A | 2/1995 | Enayati | |
| 5,437,481 A * | 8/1995 | Spears et al. | 285/148.13 |
| 5,582,439 A | 12/1996 | Spears | |
| 6,776,421 B2 * | 8/2004 | Florence et al. | 277/602 |
| 2002/0096880 A1 * | 7/2002 | Schulz et al. | 285/133.11 |
| 2003/0184085 A1 * | 10/2003 | Thompson | 285/92 |

* cited by examiner

*Primary Examiner* — Aaron Dunwoody
(74) *Attorney, Agent, or Firm* — Occhiuti Rohlicek & Tsao LLP

(57) ABSTRACT

The pipe fitting comprises a plastic body (2) and a reinforcement ring (3) around the outside of the plastic body (2). The reinforcement ring (3) holds the body expansion under control. The reinforcement ring (3) is positioned at the distance (d) from the front end of the pipe fitting (1).

9 Claims, 1 Drawing Sheet

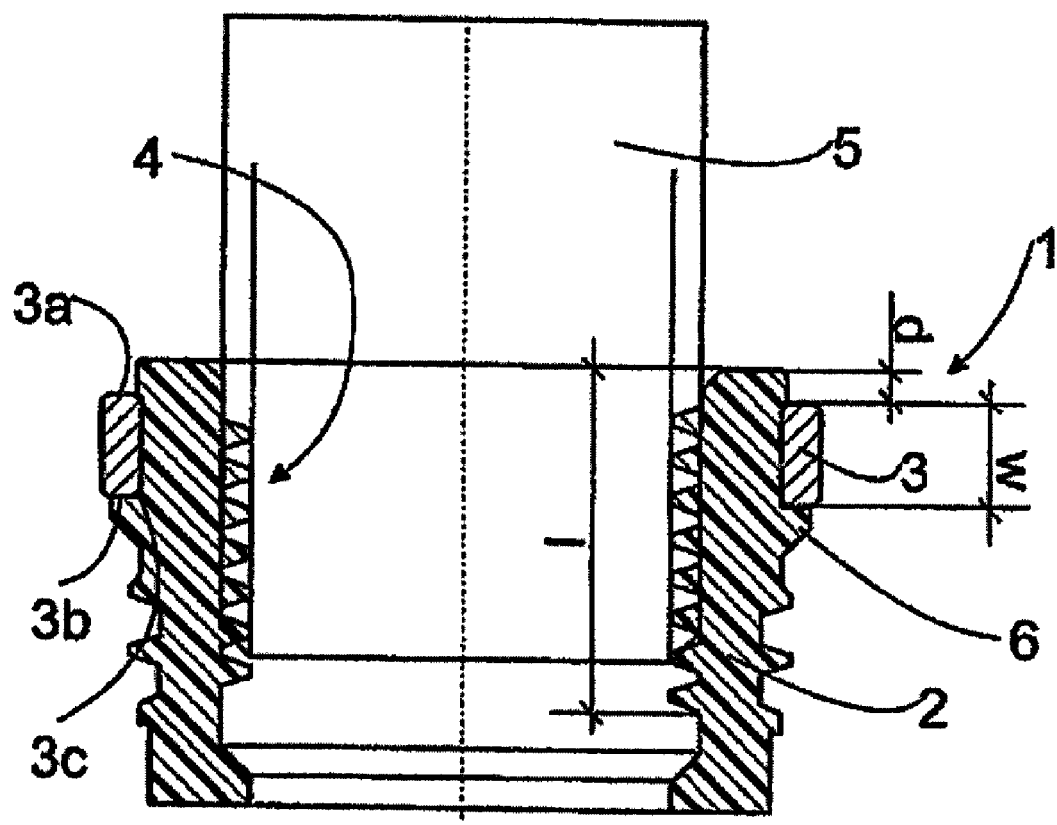

PIPE FITTING

CROSS-REFERENCE TO RELATED APPLICATIONS

This application is the National Stage of International Application No. PCT/FI2007/050292 filed May 23, 2007, which claims the priority of European Application No. 06114575.1, filed on May 26, 2006. The contents of both applications are hereby incorporated by reference in their entirety.

BACKGROUND OF THE INVENTION

The invention relates to a pipe fitting comprising a plastic body and a reinforcement ring around the outside of the plastic body.

Pipe fittings having internal taper threads or female threads are commonly used in the plumping industry. Parts having male pipe threads are threaded into female pipe threads in the fitting to form a pipe joint. Pipe fittings made of plastic with female pipe threads are particularly susceptible to structural failure. It is known to solve this problem by placing a reinforcement ring around the outside of the female pipe fitting to restrict and/or inhibit expansion and splitting of the pipe fitting. However, there is a need to improve the female pipe fittings.

U.S. Pat. No. 5,582,439 discloses a strengthened pipe fitting for connecting to an externally threaded surface. The strengthened pipe fitting comprises a pipe fitting having an internally threaded surface and a compression band fitted onto the attachment end of the pipe fitting. The pipe fitting is initially manufactured, in absence of the compression band, to have an internally threaded surface with a pitch diameter larger than that specified for mating with the externally threaded surface. The compression band is then fitted onto the attachment end of the pipe fitting. The compression band is uniquely sized to compress the internally threaded surface sufficiently so that the internally threaded surface of the strengthened pipe fitting mates with the externally threaded member. However, the manufacture of such a fitting is quite difficult and complex.

BRIEF DESCRIPTION OF THE INVENTION

The object of the present invention is to provide an improved pipe fitting.

The pipe fitting of the invention is characterized in that the reinforcement ring is positioned at a distance from the front end of the pipe fitting.

The described pipe fitting comprises a body made of plastic and a reinforcement ring around the outside of the plastic body. The reinforcement ring is positioned at a distance from the front end of the pipe fitting. The reinforcement ring holds body expansion under control. Thus, the reinforcement ring reduces displacements in the plastic body and in this way reduces tensile stresses developed in the plastic body. Because there is a distance between the reinforcement ring and the front end of the pipe fitting, excessive force during the tightening of the male part in to the pipe fitting can be prevented.

In one embodiment, the corner of the reinforcement ring located at the back end of the reinforcement ring and against the plastic body of the pipe fitting is rounded. This reduces stress peaks in the plastic body, which are caused by the male part that is to some extent conical. In another embodiment, the plastic body comprises a support rib in the fitting, which supports the back end of the reinforcement ring. This rib also supports the fitting against the stresses caused by the conical male part which bends the reinforcement ring.

In a yet another embodiment, the plastic body of the fitting is manufactured separately from the reinforcement ring and the reinforcement ring is snapped on the body. Manufacturing the body and the reinforcement ring separately provides the advantages that the pipe fitting is easy to manufacture and it is easier to make the structures and forms of the body and reinforcement ring with the desired properties.

BRIEF DESCRIPTION OF THE FIGURES

The invention will be described in detail with reference to the accompanying FIGURE which schematically shows a side view of a part of a pipe fitting in cross section.

DETAILED DESCRIPTION OF THE INVENTION

The FIGURE schematically shows a part of a pipe fitting 1. The pipe fitting 1 can be a bend or a T-fitting or a straight fitting or any other suitable pipe fitting.

The pipe fitting 1 comprises a plastic body 2 and a reinforcement ring 3 positioned around the plastic body 2. The material of the plastic body can be polypropylene PP, polyethylene PE, polyphenyl sulphone PPSU, polysulphone PSU, polyvinylidene fluoride PVDF, polytetrafluorethylene PTFE, polyketones, polyether ketone PEEK, polyacetale POM, or some other plastic material, for example. The reinforcement ring 3 can be made of metal, such as stainless steel, aluminium, copper, or brass. The reinforcement ring 3 can also be made of plastic, for example. The plastic can be reinforced such that it has better properties against elongation than the material of the plastic body 2.

The plastic body 2 comprises internal threads or female threads 4. When the pipe fitting 1 is used, a part 5 with male threads or a male part is positioned inside the plastic body such that the male threads mate with female threads 4. The part 5 with male threads can be an end of a pipe or a pipe fitting with male threads or any other suitable part, for example.

The part 5 with male threads tends to expand the plastic body 2 of the pipe fitting 1. The purpose of the reinforcement ring is to reduce the displacement in the plastic body 2 and thereby reduce the tensile stresses developed in the plastic body 2. The reinforcement ring 3 is dimensioned such that when the stress level of the plastic body exceeds a certain degree, the reinforcement ring 3 starts to yield. This changes the tension in the plastic body to compression stress in the critical area near the front end of the plastic body. The front end of the plastic body 2 is the part of the pipe fitting which first receives the part 5 with male threads inserted into the pipe fitting 1.

The width w of the reinforcement ring 3 is significantly shorter than the length l of the part with female threads 4. Preferably the length l is more than double the width w. With this dimensioning, the feature of different stresses acting together can be avoided.

There is a distance d between the front end 3a of the reinforcement ring 3 and the front end of the pipe fitting. Because of this distance on the mouth side of the pipe fitting 1, a too tight installation of the part 5 with the male threads can be indicated. A too tight installation of the part 5 with male threads causes peeling of the front end of the plastic body 2. Thus, a too tight installation can be observed visibly. The distance d is preferably greater than 0.2 millimeters, more preferably greater than 0.5 millimeters if the inner diameter of a pipe fitting is 12 millimeters, for example.

At the back end 3b of the reinforcement ring 3, there is a rounded corner 3c. The rounded corner 3c is the inner corner of the reinforcement ring and is thus against the plastic body 2. The part 5 with male threads is typically somewhat conical and thus it tends to bend the reinforcement ring such that back end 3b stress causes stress peaks against the plastic body 2. By making the corner 3c rounded, the stress peaks in the plastic body 2 can be reduced. The radius of curvature of the rounded corner 3c is preferably greater than 0.1 millimeters, more preferably greater than 0.2 millimeters if the inner diameter of the pipe fitting is 12 mm, for example.

The outer surface of the plastic body 2 is also provided with a support rib 6. The support rib 6 also strengthens the structure of the pipe fitting such that the stresses caused by the part 5 with male threads does not break the pipe fitting 1.

The plastic body 2 of the pipe fitting 1 is manufactured separately from the reinforcement ring 3. Thus, the plastic body 2 is made by injection moulding, for example. Thereafter the reinforcement ring 3 is snapped onto the plastic body 2. Thus, it is easy to manufacture the plastic body 2 and reinforcement ring 3 such that they have all the desired properties.

For a man skilled in the art, it is obvious that in the course of technical progress, the basic idea of the invention can be carried out in numerous ways. Thus, the invention and its embodiments are not limited by the above examples but they may vary within the scope of the appended claims.

The invention claimed is:

1. A pipe fitting comprising a plastic body and a reinforcement ring around an outside of the plastic body, the plastic body having plastic inner threads, wherein the reinforcement ring is positioned at a distance from a front end of the pipe fitting, the distance being selected such that over tightening a part with male threads causes peeling of the front end of the pipe fitting.

2. A pipe fitting as claimed in claim 1, wherein an inner corner at a back end of the reinforcement ring is rounded.

3. A pipe fitting as claimed in claim 2, wherein a radius of curvature of the rounded corner is greater than 0.1 millimeters.

4. A pipe fitting as claimed in claim 1, wherein the plastic body comprises a support rib for supporting a back end of the reinforcement ring.

5. A pipe fitting as claimed in claim 1, wherein the plastic body is manufactured separately from the reinforcement ring and the reinforcement ring is snapped on the plastic body.

6. The pipe fitting of claim 1 wherein the distance between the reinforcement ring and the front end is greater than 0.5 millimeters when an inner diameter of the pipe fitting is 12 millimeters.

7. The pipe fitting of claim 1 wherein the distance between the reinforcement ring and the front end is greater than 0.2 millimeters when an inner diameter of the pipe fitting is 12 millimeters.

8. The pipe fitting of claim 1 wherein an inner diameter of the pipe fitting is no greater than 24 times the distance between the reinforcement ring and the front end.

9. The pipe fitting of claim 1 wherein an inner diameter of the pipe fitting is no greater than 60 times the distance between the reinforcement ring and the front end.

* * * * *